United States Patent [19]

Mori

[11] Patent Number: 4,822,123

[45] Date of Patent: Apr. 18, 1989

[54] OPTICAL RADIATOR

[76] Inventor: Kei Mori, 3-16-3-501, Kaminoge, Setagaya-ku, Tokyo, Japan

[21] Appl. No.: 661,872

[22] Filed: Oct. 17, 1984

Related U.S. Application Data

[63] Continuation of Ser. No. 396,823, Jul. 9, 1982, abandoned.

[30] Foreign Application Priority Data

Jul. 13, 1981 [JP] Japan .................... 56-109108

[51] Int. Cl.$^4$ .................................................. G02B 5/14
[52] U.S. Cl. ............................ 350/96.10; 350/96.29; 350/320; 362/32
[58] Field of Search ............... 350/96.10, 96.24, 96.29, 350/96.30, 320; 362/32

[56] References Cited

U.S. PATENT DOCUMENTS

| | | | |
|---|---|---|---|
| 3,526,880 | 9/1970 | Filippazzi | 350/96.10 |
| 3,641,332 | 2/1972 | Reick et al. | 350/96.10 |
| 3,829,675 | 8/1974 | Mariani | 350/96.10 |
| 4,128,332 | 12/1978 | Rowe | 350/96.10 |
| 4,317,615 | 3/1982 | Herold | 350/96.10 |
| 4,367,918 | 1/1983 | Pinnow | 350/96.30 |
| 4,387,954 | 6/1983 | Beasley | 350/96.29 |
| 4,420,796 | 12/1983 | Mori | 362/32 |
| 4,459,642 | 7/1984 | Mori | 362/32 |
| 4,460,940 | 7/1984 | Mori | 362/32 |

FOREIGN PATENT DOCUMENTS

| | | | |
|---|---|---|---|
| 15339 | 2/1977 | Japan | 350/96.10 |
| 57114105 | 8/1986 | Japan | |
| 57154204 | 8/1986 | Japan | |

Primary Examiner—William L. Sikes
Assistant Examiner—Frank González
Attorney, Agent, or Firm—Merchant, Gould, Smith, Edell, Welter & Schmidt

[57] ABSTRACT

An optical radiator for diffusingly radiating sunlight emitted from an optical-conductor cable for the purpose of illumination. In order to illuminate a sufficiently wide region surrounding the optical-conductor cable, a cladding layer of the optical-conductor cable located in the region to be illuminated is excised, and the outer surface of the thus exposed core of the optical-conductor cable is topically covered by a fine grain adhesive with a refractive index equal to or greater than that of said core. The resulting adhesive elements are relatively densely distributed toward a downstream direction and thinly distributed upstream, or the adhering area of the elements is selected to be smaller upstream and larger downstream.

5 Claims, 2 Drawing Sheets

OPTICAL RADIATOR

This is a continuation of application Ser. No. 396,823, filed July 9, 1982, now abandoned.

SUMMARY OF THE INVENTION

The present invention relates to an improvement of an optical lighting device, more particularly to a novel optical radiator wherein sunlight or other light propagated through an optical-conductor cable can be diffusingly radiated therefrom at a high efficiency.

Recently, much attention has been given to energy-saving. Extensive research and development has been conducted in various fields for the effective utilization of sunlight energy. The present inventor has made various proposals for the effective utilization of sunlight energy for illumination. Sunlight energy can be most effectively used by using it directly for illumination in the form of light energy, i.e., not converting it to other forms of energy such as electricity or heat.

In this respect, the present inventor has previously proposed various sunlight energy concentrating and collecting apparatuses in which sunlight is concentrated using a lens system or the like, guided into an optical-conductor cable, transmitted through said optical-conductor cable to places where illumination is required, and emitted from the optical-conductor cable for illumination.

In conventional apparatuses, the sunlight transmitted through the optical-conductor cable is emitted and diffused from the exit end of the optical-conductor cable. Sunlight emitted from said exit end, however, is relatively narrow in diffusion angle. Therefore, the region sufficiently illuminated by the optical-conductor cable is small and the scope of utilization of sunlight for illumination is narrow.

The present invention is intended to overcome the aforementioned defect of the prior art. According to the present invention, at least one end portion of the cladding layer of the optical-conductor cable located in the region to be illuminated is excised and the outer surface of the thus exposed core of the optical-conductor cable is topically covered by a fine grain adhesive with a refractive index equal to or greater than that of said core.

The advantages offered by the present invention are that sunlight propagated through the optical-conductor cable can not only be emitted and diffused from the exit end of the optical-conductor cable but also be diffusingly radiated from the outer surface of the cable. The optical radiator according to the present invention is also simple in construction and low in manufacturing cost.

BRIEF DESCRIPTION OF THE DRAWINGS

Turning now to the drawings, in which similar reference characters denote similar elements.

DETAILED DESCRIPTION OF THE INVENTION

Figure 1:
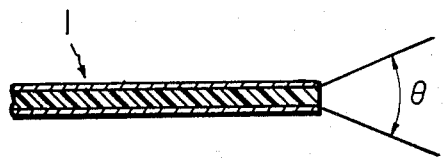
FIG. 1 is a longitudinal sectional view showing a conventional optical-conductor cable as an optical radiator, wherein the extent of the diffusion angle of sunlight emitted from the optical-conductor cable is illustrated.

FIG. 1 is a schematic diagram illustrating an optical-conductor cable 1 to which the present invention is applied. As shown in FIG. 1, when sunlight energy is utilized for illumination, the optical-conductor cable is transversally cut at its one end so as to form an exit thereof. The transmitted sunlight is repeatedly reflected at the inner boundary surfaces of the optical-conductor cable for propagation therealong, then is emitted from said exit.

The diffusion angle $\theta$ of the sunlight emitted from said exit, however, depends upon the critical angle of incidence of the material forming the optical-conductor cable. The diffusion angle is usually not greater than 46° for conventional material used to form optical-conductor cables, i.e., is relatively narrow. Sunlight emitted from said exit can therefore only illuminate a limited, narrow area. It cannot illuminate a sufficiently wide area in a room.

In order to overcome the aforementioned disadvantage of the prior art, the present inventor has proposed various optical radiators which can effectively diffuse the sunlight transmitted through an optical-conductor cable. The present invention belongs to one of the above optical-radiators utilizing sunlight energy.

Basically, according to the present invention, at least one end portion of the cladding layer of the optical-conductor cable located in the region to be illuminated is excised. The outer surface of the thus exposed core of the optical-conductor cable is then topically covered by a fine grain adhesive, made of, for example, epoxy-resin, with a refractive index equal to or greater than that of said core.

Figure 2:
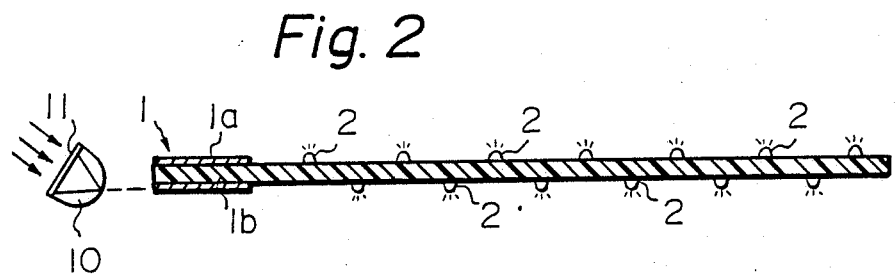
FIGS. 2 and 3 are longitudinal sectional views respectively showing the first and second embodiments of an optical radiator according to the present invention, said optical radiator being mainly utilized for illumination in a room.

FIG. 2 is a longitudinal sectional view illustrating the construction of one embodiment of an optical radiator according to the present invention. Said optical radiator comprises an optical-conductor cable 1 having a core 1b made of an optical fiber and a cladding layer 1a which surrounds the outer surface of said core 1b.

Figure 4:
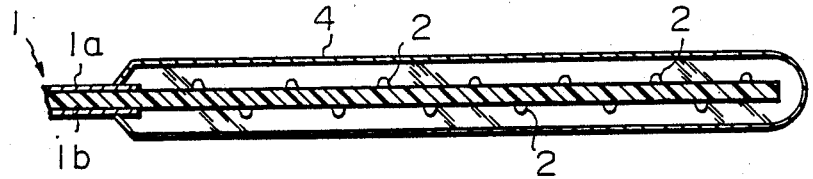
FIG. 4 is a longitudinal sectional view showing the third embodiment of an optical radiator according to the present invention, said optical radiator being mainly utilized for illumination underwater.

At least one end portion of the cladding layer 1a located in the region to be illuminated, e.g., in a room is excised. The thus exposed outer surface of the core 1b is then topically covered with a fine grain adhesive 2 made of, e.g., epoxy resin. FIGS. 2 and 4 illustrate the adhesive 2 shaped into adhesive elements. Said adhesive 2 may be selected from the group of adhesives with a refractive index equal to or greater than that of said core 1b. The other end of the optical-conductor cable 1 is connected to a conventional sunlight energy concentrating and collecting apparatus 10 having lens system 11.

Consequently, the sunlight transmitted through the optical-conductor cable 1 is not only emitted and diffused from the exit end of the optical-conductor cable but also through said adhesives 2, thus effectively illuminating a wide area.

Figure 3:
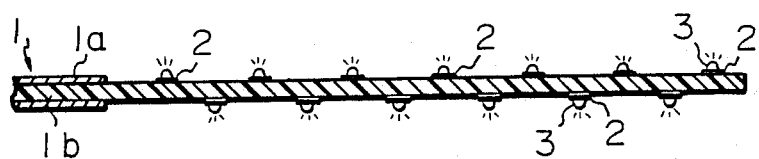

FIG. 3 shows another embodiment of an optical radiator according to the present invention. In this embodiment also at least one end portion of the cladding layer 1a is excised. The thus exposed outer surface of the core 1b of the optical conductor-cable is then topically covered by light-scattering elements 3, made of acrylic-resin or the like, adhered by adhesive 2, e.g., epoxy-resin, with a refractive index equal to or greater than that of said core 1b.

Consequently, the sunlight transmitted through the optical-conductor cable 1 may be effectively emitted through said adhesive 2 and then be effectively diffused over a wide area through said light-scattering elements 3.

The movement of sunlight in this optical radiator will now be described in detail with respect to FIGS. 2 and 3. The difference between the refractive index of core 1b and the ambient air means the sunlight propagated through the optical-conductor cable cannot be substantially emitted from the exposed portion when not provided with a fine grain adhesive or adhesive and light-scattering elements. When the exposed portion is provided with a fine grain adhesive or adhesive and light-scattering elements, however, since the refractive index of the adhesives is equal to or greater than that of the core, the propagated light will be transmitted or refracted into the fine grain adhesive or light-scattering elements.

In turn, the sunlight emitted into the fine grain adhesive (in FIG. 2) or the light-scattering elements (in FIG. 3) is repeatedly reflected therewithin before finally leaking out, thereby illuminating a wide area of the ambient air surrounding the optical-conductor cable. Needless to say, the above leakage of the sunlight is effected when the incident angle of the sunlight within the fine grain adhesive or light-scattering elements becomes smaller than the critical angle of the adhesive.

Figure 6:
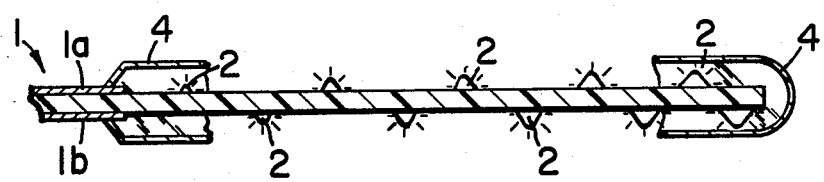
FIG. 6 is a longitudinal sectional view showing a variation of the second embodiment of an optical radiator according to the present invention.
Figure 5:
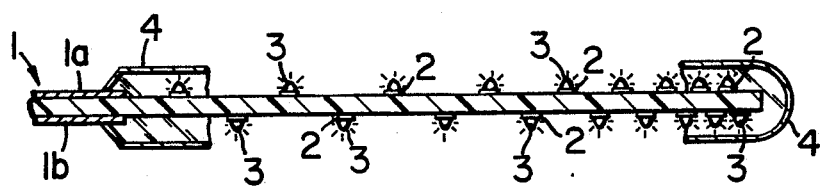
FIG. 5 is a longitudinal sectional view showing a variation of the first embodiment of an optical radiator according to the present invention.

In the embodiment described in FIGS. 2 and 3, the exposed outer surface of the core 1b is covered with uniformly distributed fine grain adhesive 2 or adhesive and light-scattering elements 3. In such a case, the intensity of the illumination along the core 1b becomes weaker from the upstream to downstream thereof. Therefore, it is preferable that the adhesive 2 or elements 3 be relatively thinly distributed upstream and densely distributed downstream of the core 1b, (see FIG. 5) or that the adhering area of them be selected smaller upstream and larger downstream of the core 1b (see FIG. 6). A combination of the former (distribution) and the latter (adhering area) is also preferable. The above are particularly effective for obtaining uniform illumination along the core 1b.

Also, in the embodiments described in FIGS. 2 and 3, the cladding layer 1a located on the end portion of the optical-conductor cable 1 is excised. However, the cladding layer located on the middle portion of the optical-conductor cable may also be excised and the thus exposed outer surface of the core of the optical-conductor cable may be topically covered by a fine grain adhesive or adhesive and light-scattering elements.

FIG. 4 is a longitudinal sectional view showing a further embodiment of an optical radiator according to the present invention. In this further embodiment, the optical radiator portion shown in FIGS. 2 and 3 is hermetically sealed in a transparent or semitransparent hollow cylindrical capsule 4. Sealing of the optical radiator portion from the surroundings by protective capsule 4 keeps fine grain adhesive 2 or light-scattering elements 3 from contact with other objects, thus, preventing detachment of the adhesive or elements from the core. It also protects the adhesive or elements soiling by the hand. Protective capsule 4 further protects the operator from injury due to contact with the heated adhesive portions. The optical radiator shown in FIG. 4 is particularly useful for underwater illumination for the purpose of, for example, artificial cultivation of chlorellas. In such a case, the sealing of said exposed portion of the optical radiator against water by protective capsule 4 completely prevents furring thereon, thus keeping the optical radiator continuously clean.

With this arrangement, said optical radiator is always surrounded by an air layer even when submerged underwater. This ensures refraction as sunlight passes from core 1b to the air layer and refraction in the water, whereby sunlight is radiated over a wide range. The underwater illumination system utilizing the optical-conductor cable according to the present invention does not require an electric element and, thus, is free from the problem of electric leakage of conventional electric illumination systems.

If it were not for the capsule 4, due to the refraction index of the water, the sunlight propagated through the optical-conductor cable 1 would merely be emitted from the exit thereof at a relatively narrow angle. In such a case, the illumination is in spotlight fashion illuminating the long distance from the exit. Furthermore, during the subsequent propagation of the light in the water, one of the components of the light will be converted by the water since the water plays a role of a photo filter for red light, i.e., absorbs most of the red light. The thus obtained light is thus deficient in red light, which is essential for photosynthesis, resulting in insufficient illumination for artificial cultivation of chorellas.

Contrary to the above, when the optical radiator is sealed in the capsule 4, since the sunlight is radiated over a wide range, i.e., illuminates the short distance in the water, red light will not be omitted.

As will readily be understood from the foregoing description, by means of simple and low cost arrangement, sunlight or other light propagated through the optical-conductor cable can be diffusingly radiated therefrom at a high efficiency.

The invention has been described in detail with particular reference to preferred embodiment thereof, but it will be understood that reasonable variations and modifications are possible without departing from the spirit and basic scope of the invention.

I claim:

1. An optical radiator for diffusingly radiating sunlight emitted from an optical-conductor cable for the purpose of illumination of a region, said optical-conductor cable transmitting light from an upstream direction toward a downstream direction and including a core made of optical fiber and a cladding layer covering the outer surface of said core, the improvement comprising: at least one end portion of said cladding layer located in said region is excised and the outer surface of the thus exposed core of the optical-conductor cable being topically covered with a plurality of fine grain adhesive elements each having an adhering area, said elements with a refractive index equal to or greater than that of said core, and the adhering area of each of said elements being smaller on said elements affixed upstream and larger on said elements affixed downstream of said exposed core.

2. An optical radiator for diffusingly radiating sunlight emitted from an optical-conductor cable for the purpose of illumination of a region, said optical-conductor cable transmitting light from an upstream direction toward a downstream direction and including a core made of optical fiber and cladding layer covering the outer surface of said core, the improvement comprising: at least one end portion of said cladding layer located in said region is excised and the outer surface of the thus exposed core of the optical conductor cable being topically covered with a plurality of light-scattering elements adhered to said core with an adhesive with a refractive index equal to or greater than that of said core, and said light-scattering elements being thinly distributed on the upstream portion and densely distributed on the downstream portion of the exposed core.

3. An optical radiator for diffusingly radiating sunlight emitted from an optical-conductor cable for the purpose of illumination of a region, said optical-conductor cable transmitting light from an upstream direction toward a downstream direction and including a core made of optical fiber and a cladding layer covering the outer surface of said core, the improvement comprising: that at least one end portion of said cladding layer located in said region to be illuminated is excised, that the outer surface of the thus exposed core of the optical-conductor cable is topically covered with a plurality of fine grain adhesive elements each having an adhering area or, a plurality of light-scattering elements each having an adhering area adhered with an adhesive, the refractive index of said adhesives being equal to or greater than that of said core, and that said thus exposed core of the optical-conductor cable is hermetically sealed in a transparent or semitransparent hollow cylindrical capsule, and the adhering area of said adhesive elements or said light-scattering elements being smaller on said elements affixed upstream and larger on said elements affixed downstream of the core.

4. An optical radiator for diffusingly radiating sunlight emitted from an optical-conductor cable for the purpose of illumination of a region, said optical-conductor cable transmitting light form an upstream direction toward a downstream direction and including a core made of optical fiber and cladding layer covering the outer surface of said core, the improvement comprising: that at least one end portion of said cladding layer located in said region is excised, that the outer surface of the thus exposed core of the optical-conductor cable is topically covered with a plurality of fine grain adhesive elements or, a plurality of light-scattering elements adhered with an adhesive, the refractive index of said adhesives being equal to or greater than that of said core, and that said thus exposed core of the optical-conductor cable is hermetically sealed in a transparent or semitransparent hollow cylindrical capsule, and said adhesive elements or said light-scattering elements being thinly distributed on the upstream portion and densely distributed on the downstream portion of the core.

5. A method of illumination of a region using an optical radiator having an optical conductor cable including a core, and a first or upstream end and a second or downstream end, with an optical fiber cover and a cladding layer surrounding said core, with said cladding layer excised at said second end in said region with the exposed core of said optical cable topically covered with a plurality of fine grain adhesive elements each having an adhering area and with a refractive index equal to or greater than that of said core, and the adhering area of each of said elements being smaller on said elements affixed upstream and larger on said elements affixed downstream of the exposed core, comprising the steps of:
(a) connecting said first end of said conductor cable to a light concentrating and collecting apparatus;
(b) transmitting said light through said optical conductor to said exposed core, said light reaching said adhering elements having said smaller adhering areas before reaching said adhering elements having said larger adhering areas; and
(c) emitting said light through said adhesive elements and said end of said optical conductor to form a wide field of uniform illumination.

* * * * *